US007869172B2

United States Patent
Itoi et al.

(10) Patent No.: US 7,869,172 B2
(45) Date of Patent: Jan. 11, 2011

(54) DIGITAL CONTROLLER

(75) Inventors: Makoto Itoi, Chiyoda-ku (JP); Kenichi Iwata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 441 days.

(21) Appl. No.: 12/132,347

(22) Filed: Jun. 3, 2008

(65) Prior Publication Data

US 2009/0177429 A1 Jul. 9, 2009

(30) Foreign Application Priority Data

Jan. 8, 2008 (JP) .............................. 2008-001292

(51) Int. Cl.
*H02H 3/00* (2006.01)
(52) U.S. Cl. ........................................................ 361/42
(58) Field of Classification Search ................... 361/42
See application file for complete search history.

(56) References Cited

U.S. PATENT DOCUMENTS 5,638,057 A * 6/1997 Williams .................... 340/947
5,872,457 A * 2/1999 Williams .................... 324/654
6,888,708 B2 * 5/2005 Brungs et al. ................. 361/42

FOREIGN PATENT DOCUMENTS

JP 08-338296 A 12/1996

* cited by examiner

*Primary Examiner*—Stephen W Jackson
(74) *Attorney, Agent, or Firm*—Sughrue Mion, PLLC

(57) ABSTRACT

An input processing unit of safe digital controller includes units for determining ground when a voltage V from an input terminal is equal to or lower than a ground determination value; for outputting a first specified value regardless of the voltage V during a first given period immediately after the controller starts; for outputting a value based on the voltage V when the voltage V is equal to or higher than the ground fault determination value and equal to or lower than a disconnection determination value after the first given period, outputting a third specified value during a second given period after the first given period when the voltage V is lower than the ground fault determination value, and outputting the first specified value when a state in which the voltage V is lower than the ground fault determination value is maintained for the second given period or longer; and for outputting a second specified value during the second given period when the voltage V is higher than the disconnection determination value after the first given period, and outputting the first specified value when a state in which the voltage V is higher than the disconnection determination value is maintained for the second given period or longer.

12 Claims, 11 Drawing Sheets

DIGITAL CONTROLLER

BACKGROUND OF THE INVENTION

1. Field of the Invention

The present invention relates to a digital controller that receives an analog signal as an input and converts the analog signal into a digital signal to be processed, and more particularly, to an input process that takes into consideration a disconnection or a short circuit of an input signal line to which an analog input signal is input.

2. Description of the Related Art

As the device of the above type, for example, JP 08-338296 A discloses a vehicle controller that is capable of precisely discriminating the disconnection of a ground conductor from the disconnection of a signal line or a normal state. In the vehicle controller, an oil temperature sensor, a water temperature sensor, and an engine speed sensor share the ground terminal, and signal lines are connected to the respective input circuits. The microcomputer circuit detects a detection signal of the oil temperature sensor, and intermittently and repetitively discriminates whether the detection signal falls within a predetermined failure detection range, or not. Then, when the number of times the detection signal is determined as the failure detection range reaches a given limit value, an engine and an automatic transmission are caused to execute a fail safe control. Since the ground terminal is shared by the respective sensors, the number of connector pins and the number of wirings are reduced, and there is no need to provide a specific circuit for detecting the disconnection of the ground conductor.

In the above device, when a disconnection or a short circuit occurs in the input signal line from the sensor, an abnormal sensor value, that is, an abnormal input value is input until the disconnection or the short circuit is detected, which causes the possibility that a malfunction occurs in the controller or a control system having the controller, or an abnormal sensor value is displayed on a display unit.

SUMMARY OF THE INVENTION

An object of the present invention is to provide a digital controller that prevents, when a disconnection or a short circuit occurs on the input signal line side, a false control of the controller which is attributable to the abnormal input signal that can be generated until the disconnection or the short circuit is detected.

According to the present invention, a digital controller that converts an analog input signal from a signal output device that is connected to an input signal line into a digital input signal to output a control signal obtained by conducting a given calculating process on the digital input signal, includes: an analog/digital converter that is connected to an input terminal connected with the input signal line, and converts the analog input signal into the digital input signal; an input processing unit that obtains a control input value taking into consideration ground, ground fault, and disconnection of the input signal line according to an output of the analog/digital converter; and a signal output device power supply that is connected to the input terminal within the digital controller. The input processing unit includes: ground determining means for determining that the input signal line is grounded when a voltage from the input terminal that is connected with the input signal line is equal to or lower than a ground determination value; failure determination invalidating means for outputting a first specified value as the control input value regardless of a voltage from the input terminal during a first given period immediately after the digital controller starts; ground fault detecting means for conducting a ground fault determining process on the input signal line when the voltage from the input terminal is lower than a ground fault determination value which is a lower limit of an output range of the signal output device after the first given period, outputting a value based on the voltage from the input terminal as the control input value when the voltage from the input terminal is equal to or higher than the ground fault determination value and equal to or lower than a disconnection determination value that is an upper limit of the output range, outputting a third specified value as the control input value during a second given period after the first given period when the voltage from the input terminal is lower than the ground fault determination value, and outputting the first specified value as the control input value when a state in which the voltage from the input terminal is lower than the ground fault determination value is maintained for the second given period or longer; and disconnection detecting means for conducting a disconnection determining process on the input signal line when the voltage from the input terminal is higher than the disconnection determination value after the first given period, outputting a second specified value as the control input value during the second given period, and outputting the first specified value as the control input value when a state in which the voltage from the input terminal is higher than the disconnection determination value is maintained for the second given period or longer.

According to the present invention, the control in the disconnection determining process and the control in the short circuit determining process can be improved to be safer taking into consideration the occurrence of the disconnection and the short circuit on the input signal line side.

DETAILED DESCRIPTION OF THE PREFERRED EMBODIMENTS

Figure 9:
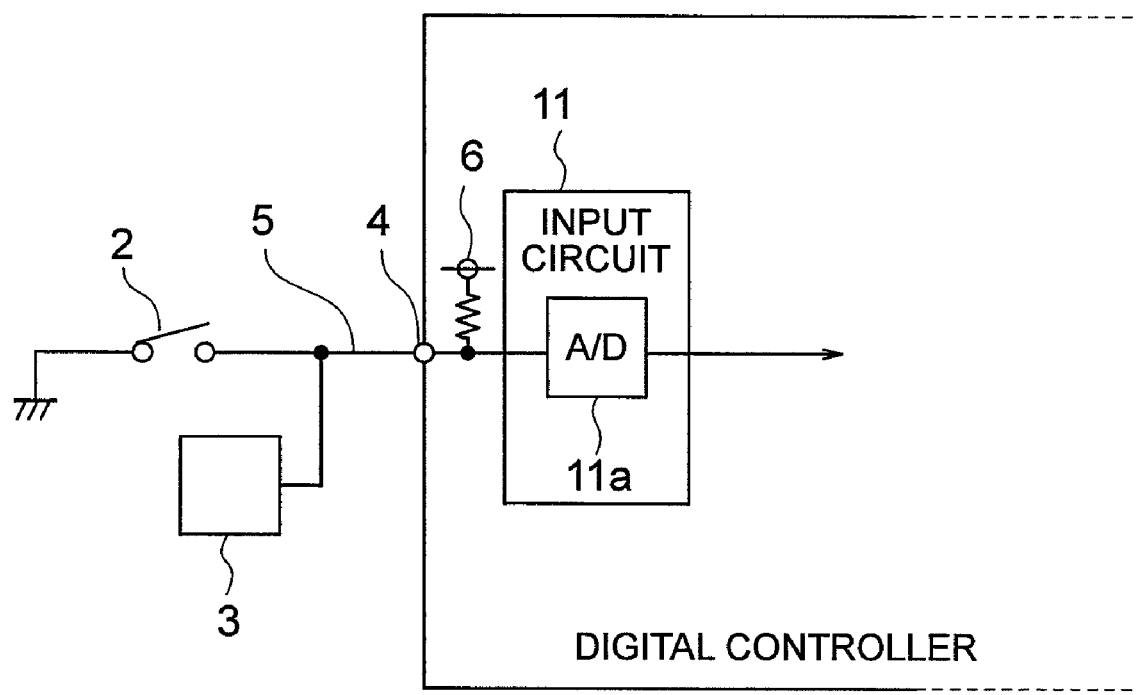
FIG. 9 is a diagram showing the configuration of the input side of the digital controller related to the present invention.

First, the technical background of the present invention will be additionally described. FIG. 9 is a diagram showing the configuration of the input side of the digital controller related to the present invention. A plurality of kinds of input signals are input to an input terminal 4 of the controller. A sensor 3 and a switch 2 are connected to the input terminal 4 as signal output devices, and the input terminal 4 receives the analog input signals from the sensor 3 and the switch 2. An input circuit 11 having an analog/digital (A/D) converter 11a that converts an analog input signal into a digital input signal is disposed at the input of the controller. A sensor power supply 6 (signal output device power supply) is connected between the input terminal 4 and the input circuit 11.

In the case where the digital controller 1 is, for example, an outboard engine controller, as the existing application example of an input signal line 5, there is a combination of a backshift switch as the switch 2 and a water pressure sensor as the sensor 3. The backshift switch generates a signal that changes over ignition timing by on/off operation. The digital controller 1 determines that the backshift switch is on in the case where the input signal is about a ground potential (0 V). The A/D conversion and the on/off determination of the backshift switch are conducted while sampling is conducted for every main routine (for example, every 5 mS). The water pressure sensor displays a coolant water pressure on a display unit such as a gauge by the aid of a signal from the water pressure sensor. The generated voltage value is subjected to A/D conversion and treated as a digital value.

The controller determines that the switch 2 is on (close state) when an input from the input terminal 4 is equal to or lower than a first given value that is regarded as a ground state, and the switch 2 is off (open state) in other cases. The sensor 3 has an output range that is equal to or larger than a third given value and is equal to or smaller than a second given value that will be described later. The third value is larger than the first given value and smaller than the second given value. The two outputs of the switch 2 and the sensor 3 are connected to the same input terminal of the controller. Thus, the plurality of input signals share one input terminal, thereby making it possible to reduce the number of terminals necessary for the controller. Also, the sensor 3 is optional, and there is a controller to which no sensor is connected.

The general disconnection detecting process in the controller determines that a disconnection has occurred when an input voltage that is larger than the second given value is detected continuously a given number of times or more or a given period of time or longer. This is because when a disconnection occurs somewhere in the input signal line 5, the voltage of the input signal line 5 increases to substantially a circuit supply voltage (for example, 5 V) due to the sensor power supply 6 between the input terminal 4 and the A/D converter 11a of the controller. Also, the general ground fault detecting process in the controller determines that a ground fault has occurred, that is, the input voltage is lower than a lower limit threshold value of the range of the sensor when the input voltage that is lower than the third given value is detected continuously for a second given period (or a second given number of times taking into consideration the number of samplings) or longer. This is because the input voltage that is input to the input circuit 11 decreases to substantially the ground voltage (for example, 0 V) when a ground fault has occurred somewhere in the input signal line 5 (including a case of the ground where the switch 2 is turned on).

Figure 10:
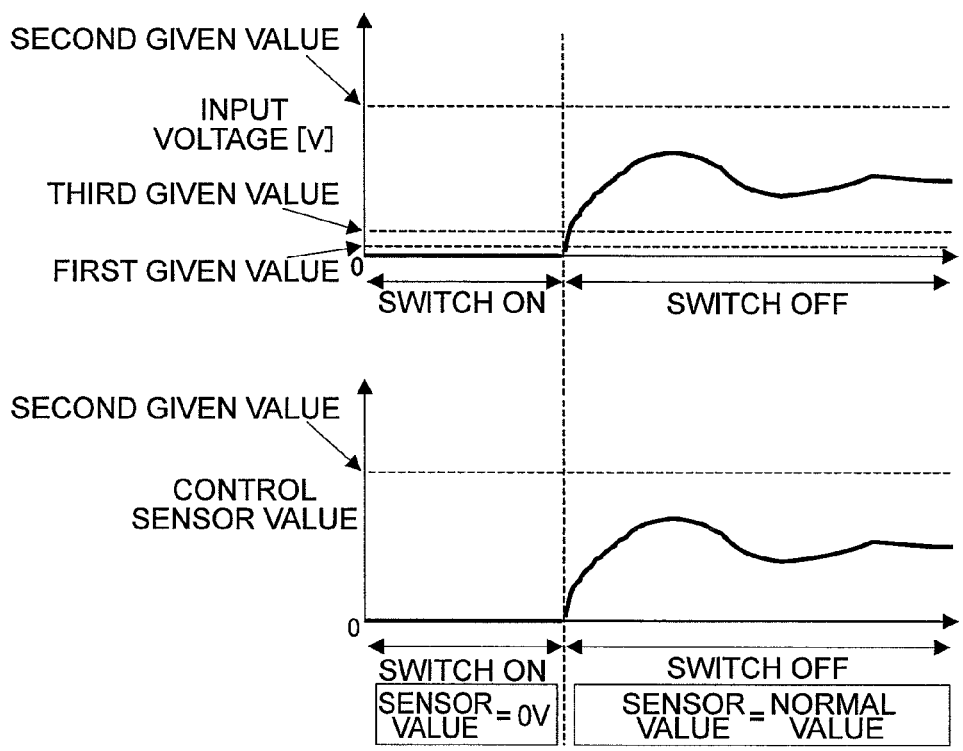
FIG. 10 is a timing chart of an input voltage and a control sensor value within the controller of the input voltage for explaining a general operation in a disconnection detecting process of the digital controller.

FIGS. 10 to 13 show timing charts for explaining the operation of the digital controller. Each of the figures shows a timing chart of the input voltage from the input terminal 4 in various statuses in the general disconnection detecting process and a control sensor value (control input value) that is actually used in the control calculation within the controller of the input voltage. As shown in FIG. 10, when the switch 2 is on, because the input signal line 5 is grounded, the input voltage from the input terminal 4 becomes 0 V, and the control sensor value of the sensor 3 within the controller at that time is also 0 V. Then, when the switch 2 changes over from on to off, a value corresponding to the input voltage from the input terminal 4 is a control sensor value within the controller.

Figure 11:
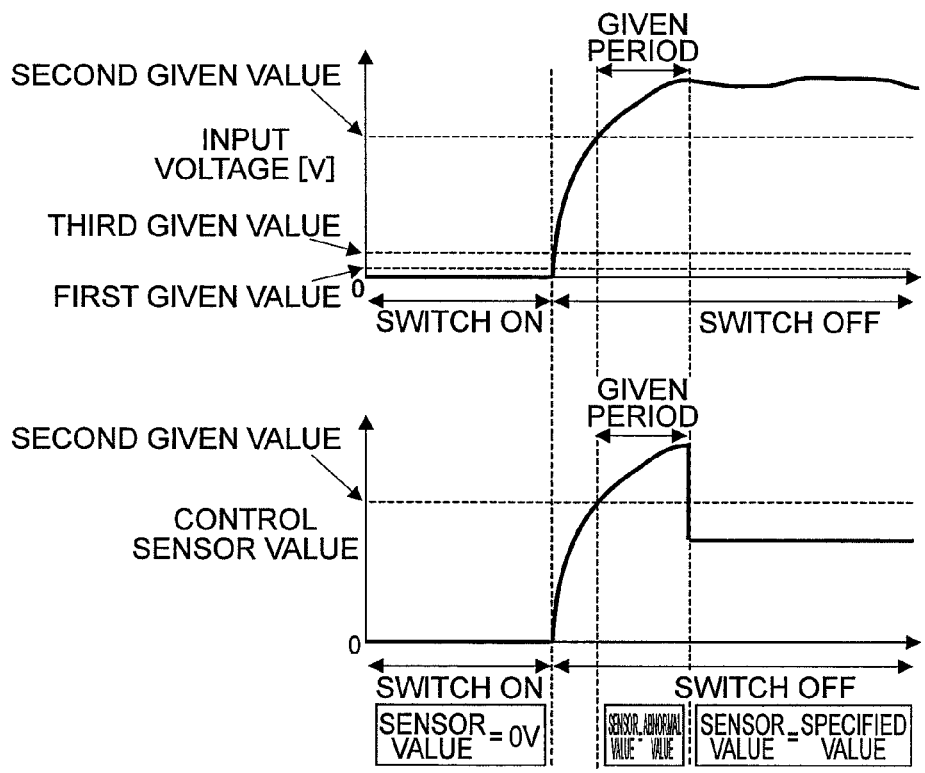
FIG. 11 is a timing chart for explaining the general operation in the disconnection detecting process of the digital controller.
Figure 12:
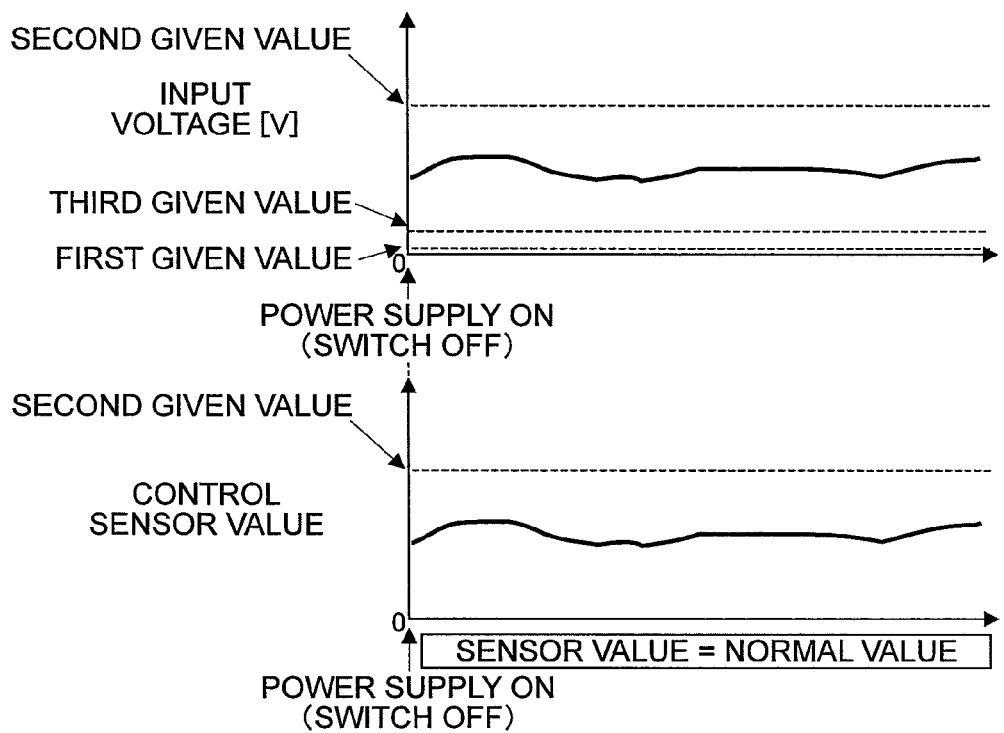
FIG. 12 is a timing chart for explaining the general operation in the disconnection detecting process of the digital controller.
Figure 13:
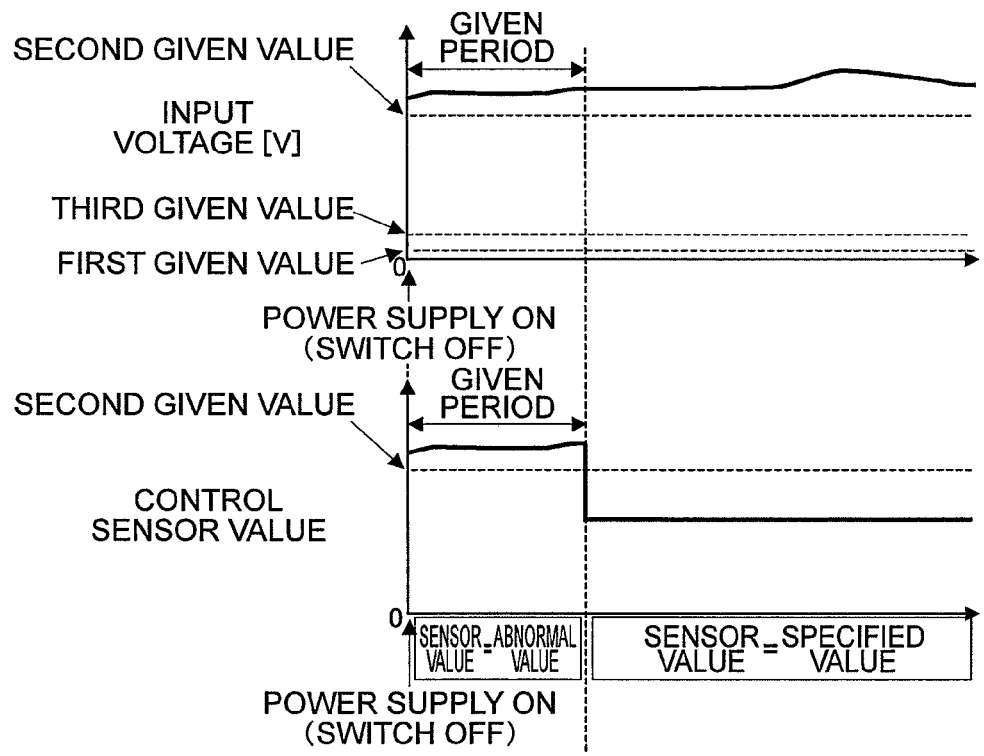
FIG. 13 is a timing chart for explaining the general operation in the disconnection detecting process of the digital controller.

Also, as shown in FIG. 11, in the case where the input signal from the input terminal 4 is equal to or larger than the third given value continuously for a given number of times (the number of samplings) or a given period of time or longer after a determination has been made that the switch 2 is off, the controller determines that the disconnection has occurred, and outputs a predetermined specified value as the control sensor value. Also, in the case where the input signal line 5 (sensor 3) is not disconnected, the voltage that is input from the input terminal 4 is smaller than the second given value as shown in FIG. 10. Therefore, when the switch 2 is turned off, the controller outputs a normal control sensor value according to a voltage that is input from the input terminal 4. Also, when the switch 2 is off, and the controller turns on the power supply (energization starts) as shown in FIG. 12, the controller outputs the normal control sensor value according to the voltage that is input from the input terminal 4, likewise. Also, as shown in FIG. 13, when the switch 2 is off, and the controller turns on the power supply, the controller outputs the control sensor value according to the input voltage from the input terminal 4. The controller determines that the disconnection has occurred when the input voltage is equal to or larger than the second given value continuously for a given number of times or more, or a given period of time or longer, and thereafter outputs the control sensor value of a specified value.

In the present invention, the control in the disconnection determining process and the control in the ground fault determining process can be improved to be a safer control taking into consideration the occurrence of the disconnection and the ground fault on the input signal line side (including the case where the switch 2 is turned on).

First Embodiment

Figure 1:
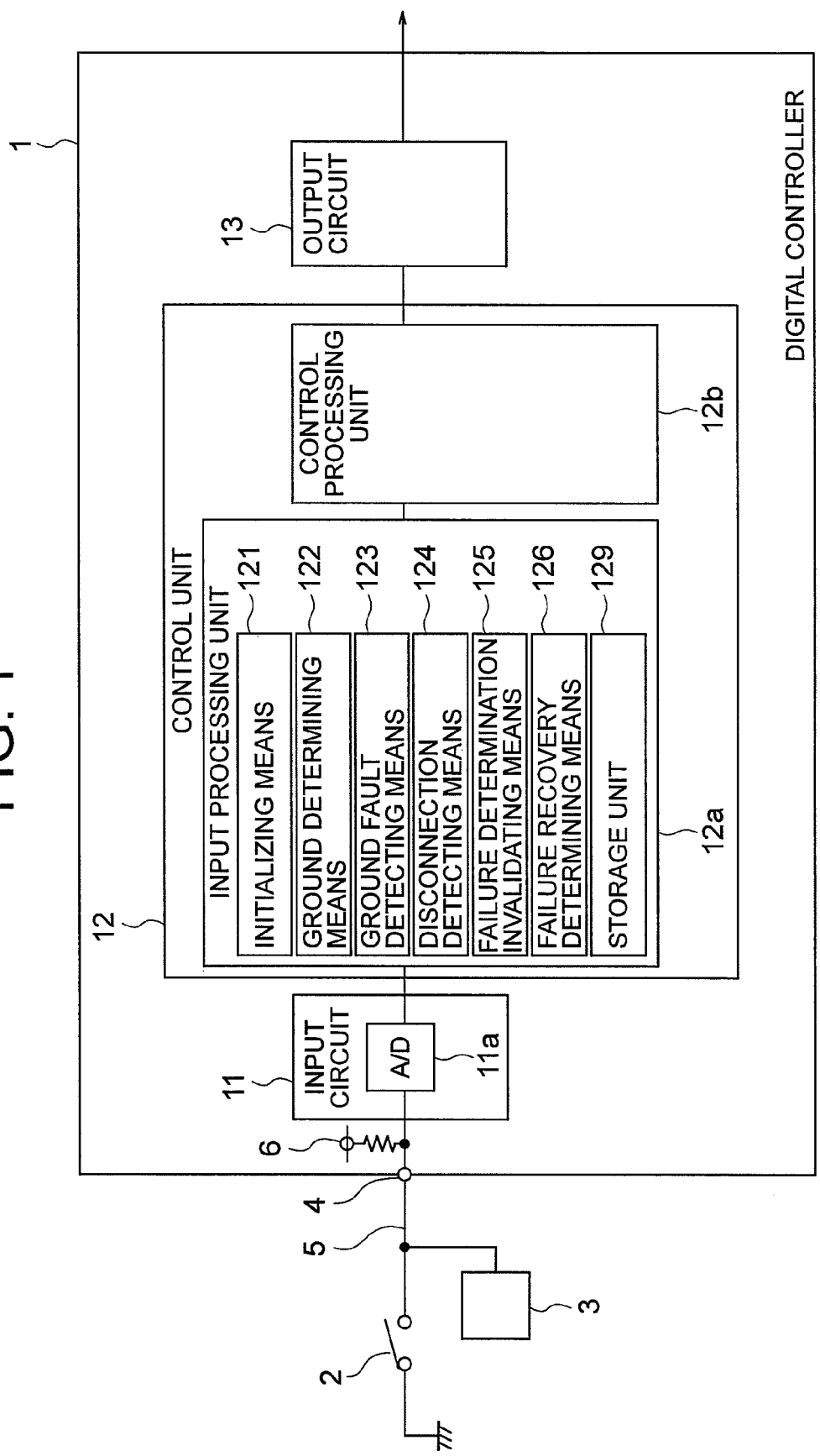
FIG. 1 is a diagram showing the configuration of a digital controller according to an embodiment of the present invention.

FIG. 1 is a diagram showing the configuration of a digital controller according to an embodiment of the present invention. A digital controller 1 includes an input circuit 11 having an analog/digital (A/D) converter 11a that converts an analog input signal into a digital input signal, a control unit 12 constituted by a computer which conducts a given calculating process on the basis of a digital input signal to generate a control signal, and an output circuit 13 that outputs the generated control signal to a device to be controlled. The control unit 12 includes a control processing unit 12b that conducts a given calculating process on the basis of the digital input signal to generate the control signal, and an input processing unit 12a that obtains, before the control processing unit 12b, a control input value (control input signal) from the input signal so as not to be affected by an abnormal input signal which is caused by the ground/pull-up state or the disconnection of the input signal line 5. The input processing unit 12a includes initializing means 121, ground determining means 122, ground fault detecting means 123, disconnection detecting means 124, failure determination invalidating means 125, failure recovery determining means 126, and a storage unit 129, which will be described later.

A plurality of kinds of input signals are input to the input terminal 4 of the controller 1. For example, a switch 2 that grounds the input signal line 5 and a sensor 3 are connected to the input terminal 4 through the input signal line 5 as signal output devices, and the input terminal 4 receives the analog input signals from the switch 2 and the sensor 3. A sensor power supply 6 is connected between the input terminal 4 and the input circuit 11. The sensor 3 has an output range which is, for example, equal to or higher than 0.2 V and equal to or lower than 4.8 V. The present invention is applicable to such a disconnection that the signal output device such as the sensor 3 is separated from the input signal line 5.

Figure 2:
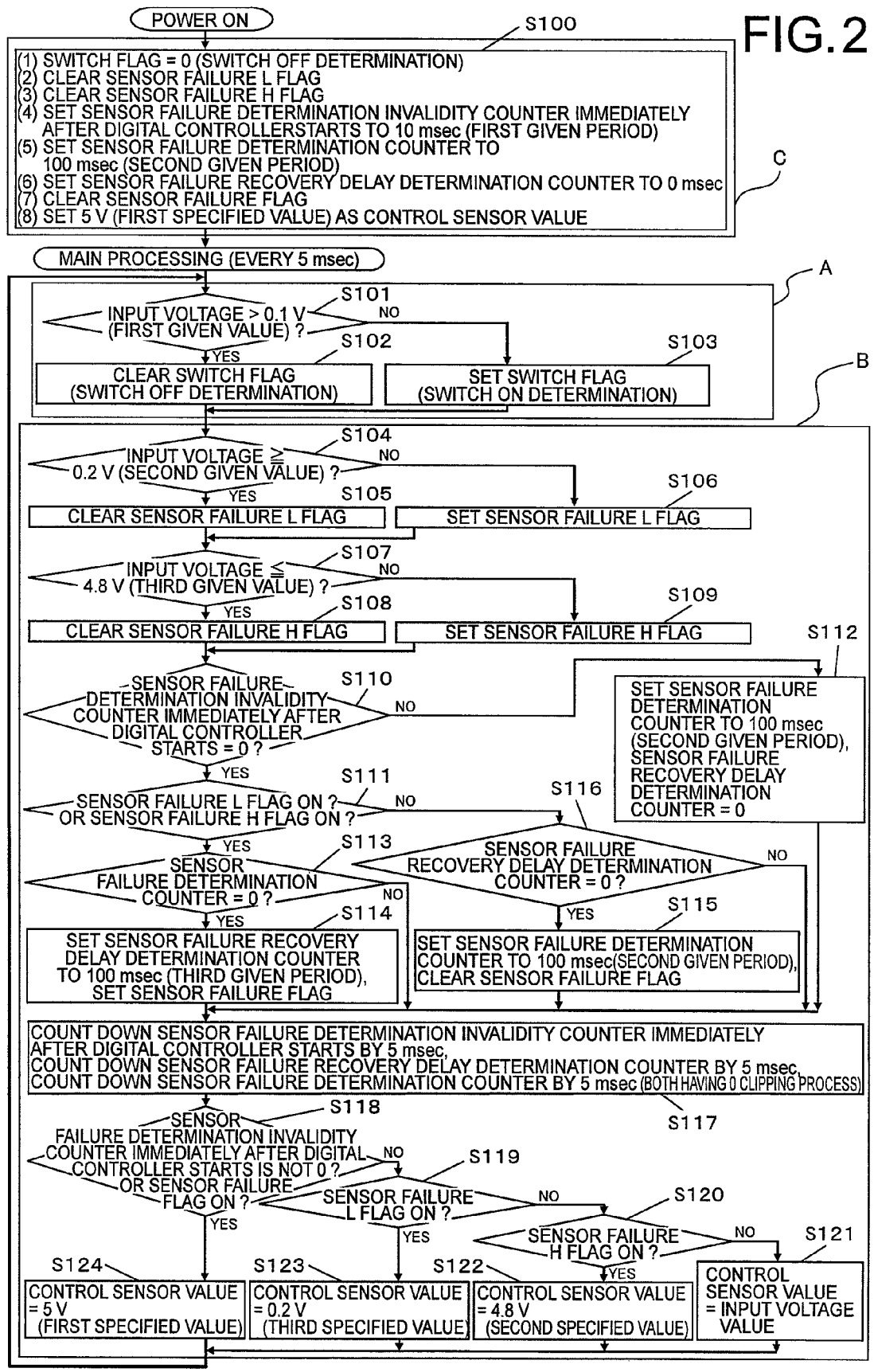
FIG. 2 is a flowchart showing the operation of an input processing unit in the digital controller shown in FIG. 1.
Figure 3:
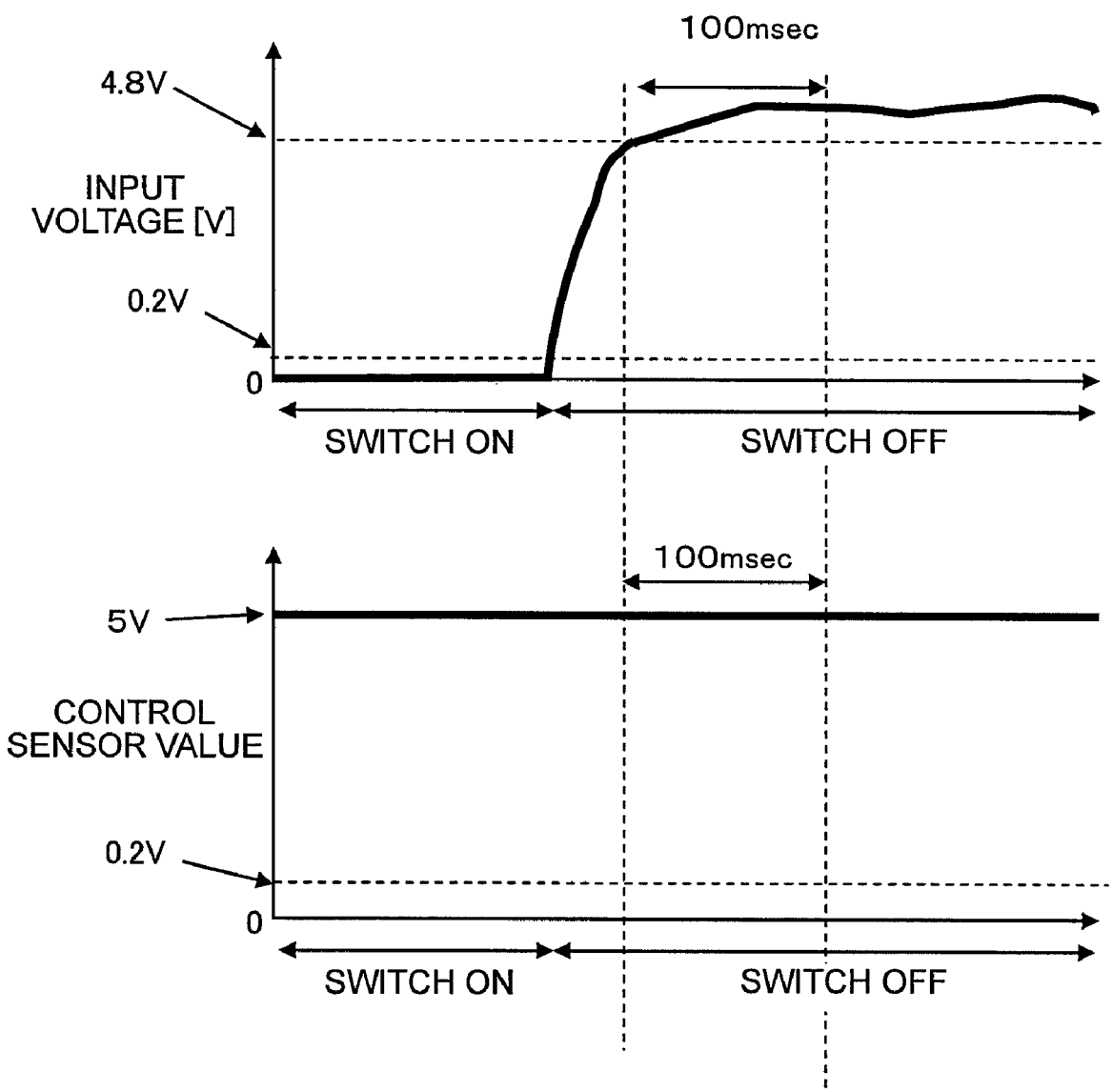
FIG. 3 is a timing chart of an input voltage and a control sensor value within the controller of the input voltage for explaining the operation of the input processing unit of the digital controller shown in FIG. 1.
Figure 4:
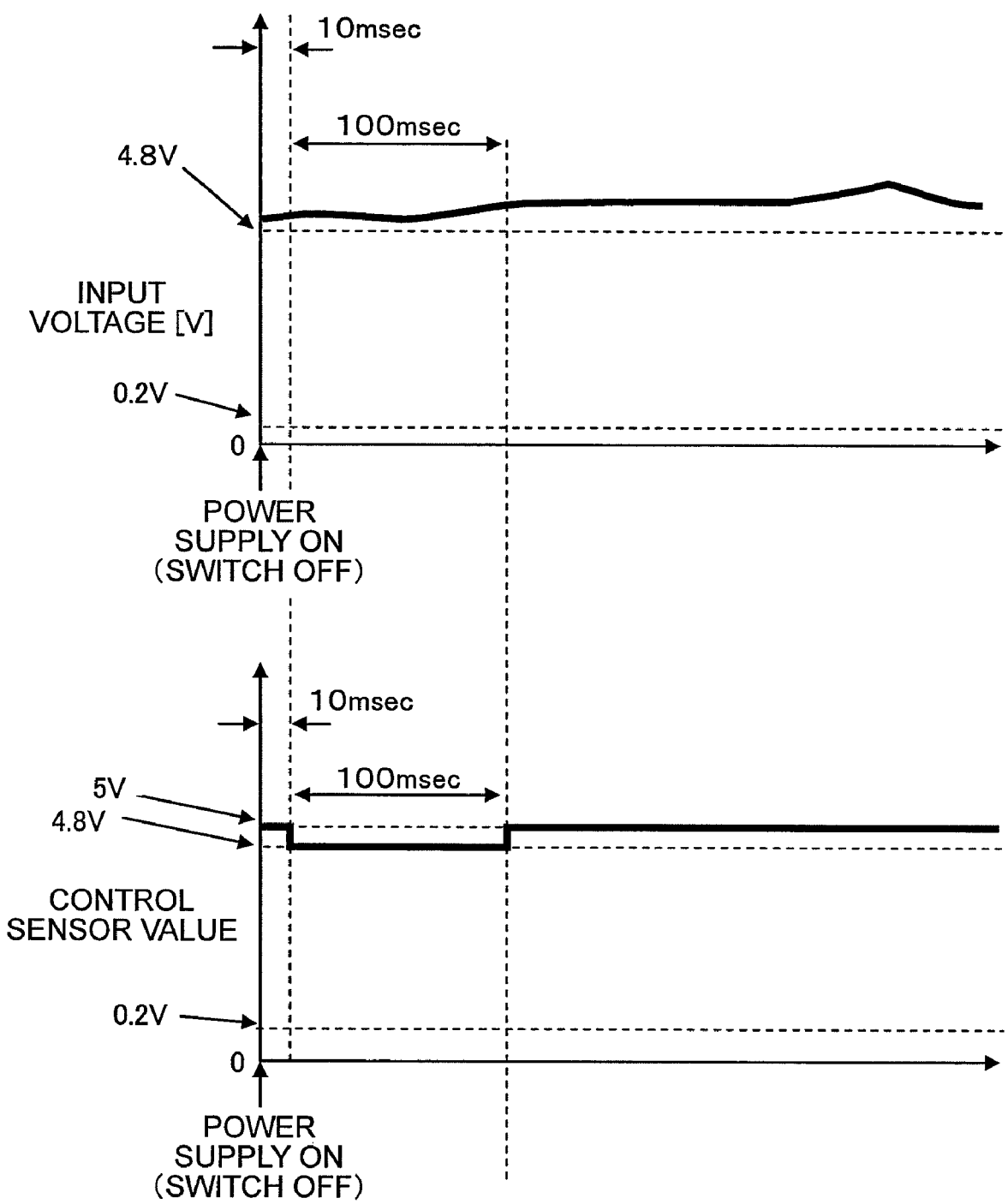
FIG. 4 is a timing chart of an input voltage and a control sensor value within the controller of the input voltage for explaining the operation of the input processing unit of the digital controller shown in FIG. 1.

Also, FIG. 2 is a flowchart showing the operation of, particularly, the input processing unit 12a within the control unit 12 of the digital controller 1 shown in FIG. 1. FIGS. 3 and 4 show timing charts of the input voltage from the input terminal 4 in various statuses and the control sensor value (control input value) that is actually used in the control calculation within the controller 1 of the input voltage. Respective given values set for determining ground, pull-up, shortcircuit, power-source short circuit, or interruption in the following description are different from the given values described above.

Hereinafter, a description will be given of the specific operation of, particularly, the input processing unit 12a in the controller shown in FIG. 1 according to this embodiment with reference to FIGS. 2 to 4. FIG. 3 shows the input voltage from the input terminal 4 when the ground state of the input signal line 5 is released where the switch 2 changes over from on to off, and the control sensor value when the input voltage has been input. Also, FIG. 4 shows the control sensor value the input voltage after the power supply of the controller 1 is turned on and the control sensor value when the input voltage is input. At the time when the power supply of the controller 1 is turned on, the sensor 3 or the input signal line 5 are in a disconnection state, and the switch 2 is held in the off state.

FIG. 2 shows a flowchart of the entire processing flow in the digital controller 1 according to this embodiment. A ground determining section A corresponding to the ground determining means 122 is a process which determines whether the switch 2 is on or not (determines whether the input voltage is equal to or lower than, for example, 0.1 V (first given value) or not for determining that the input voltage is about 0 V), which is hereinafter referred to as "an ground determining process". A ground fault/disconnection detecting section B corresponding to the ground fault detecting means 123, the disconnection detecting means 124, the failure determination invalidating means 125, and the failure recovery determining means 126 outputs an input voltage value as the control sensor value when it is determined that the input voltage from the input terminal 4 is within the upper and lower threshold values of the range of the sensor 3 (for example, the input voltage is equal to or higher than 0.2 V (second given value) and equal to or lower than 4.8 V (third given value)). Also, a specified value that will be described later is output as the control sensor value when it is determined that the input voltage from the input terminal 4 is out of the upper and lower threshold values of the range (lower than 0.2 V (second given value) and higher than 4.8 V (third given value)). Those processes are called "ground fault/disconnection detecting process". An initializing section C corresponding to the initializing means 121 is a process that sets the initial values of variables consisting of the setting values of respective flags set in the storage unit 129 which is used in the ground determining section A and the ground fault/disconnection detecting section B, or respective counters which are formed of, for example, a program. This process is called "initializing process".

When the power supply (not shown) is turned on, and the digital controller 1 starts, according to the flowchart shown in FIG. 2, the initial values of the variables used in the ground determining process and the ground fault/disconnection detecting process are set in items (1) to (8) of Step S100 in the initializing section C. The variable of the item (1) is used in the ground determining process, and the variables of the items (2) to (8) are used in the ground fault/disconnection determining process. A switch flag is cleared (=0: indicative of the off state of the switch 2) in the item (1), a sensor failure L flag and a sensor failure H flag are cleared (=0) in the items (2) and (3), respectively, a sensor failure determination invalidating counter immediately after the digital controller starts is set in 10 msec (first given period) in the item (4), a sensor failure determination counter is set in 100 msec (second given period) in the item (5), a sensor failure recovery delay determination counter is set to 0 msec in the item (6), the sensor failure flag is cleared (=0) in the item (7), and 5 V (first specified value) is set as a control sensor value in the item (8).

Upon completion of the "initializing process" of the above items (1) to (8) in FIG. 2, the subsequent process is shifted to "main processing", and the ground determining process and the ground fault/disconnection detecting process are executed in a cycle of 5 msec.

First, the ground determining process (on/off determining process of the switch 2) is conducted in the ground determining section A of FIG. 2. When the input voltage from the input terminal 4 is equal to or lower than 0.1 V (first given value) in Step S101, the switch flag is set (=1) in order to indicate that the switch 2 is on (grounded) (Step S103). When the input voltage from the input terminal 4 is higher than 0.1 V (first given value), the switch flag is cleared (=0) in order to indicate that the switch 2 is off (not grounded) (Step S102).

Upon completion of the ground determining process in the ground determining section A of FIG. 2, the ground fault/disconnection detecting process (control sensor value output process) is then conducted in the ground fault/disconnection detecting unit B. In Step S104, it is determined whether the input voltage from the input terminal 4 is equal to or higher than 0.2 V (second given value) or not, that is, whether the input voltage from the input terminal 4 is equal to or higher than the lower limit threshold value of the range of the sensor or not. When the input voltage from the input terminal 4 is equal to or higher than 0.2 V (second given value), the sensor failure L flag is cleared (=0) in order to indicate that the input voltage is equal to or higher than the lower limit threshold value of the range of the sensor (within the range of the sensor) (Step S105). When the input voltage from the input terminal 4 is lower than 0.2 V (second given value), the sensor failure L flag is set (=1) in order to indicate that the input voltage is lower than the lower limit threshold value of the range of the sensor (out of the range of the sensor) (Step S106).

Upon completion of the processing in the above Step S105 or S106, it is then determined in Step S107 whether the input voltage from the input terminal 4 is equal to or lower than 4.8 V (third given value) or not, that is, whether the input voltage from the input terminal 4 is equal to or lower than the upper limit threshold value of the range of the sensor or not. When the input voltage from the input terminal 4 is equal to or lower than 4.8 V (third given value), the sensor failure H flag is cleared (=0) in order to indicate that the input voltage is equal to or lower than the higher limit threshold value of the range of the sensor (within the range of the sensor) (Step S108). When the input voltage from the input terminal 4 is higher than 4.8 V (third given value), the sensor failure H flag is set (=1) in order to indicate that the input voltage is higher than the higher limit threshold value of the range of the sensor (out of the range of the sensor) (Step S109).

Upon completion of the processing in the above Step S108 or S109, it is determined in Step S110 whether the sensor failure determination invalidity counter immediately after the digital controller starts is 0 or not, that is, 10 msec (first given period) which is a sensor failure determination invalidity period immediately after the digital controller starts has elapsed or not. When the sensor failure determination invalidity counter immediately after the digital controller starts is 0, it is determined that 10 msec (first given period) has elapsed, and the processing is advanced to Step S111 in order to conduct the sensor failure determining process. When the condition of Step S110 is not met, it is determined that 10 msec (first given period) has not yet elapsed, the sensor failure determination counter is set to 100 msec (second given period) that is an initial value, and the sensor failure recovery delay counter is set to 0 msec that is an initial value (Step S112). In the case where the condition of Step S110 is not met, when a state in which the input voltage from the input terminal 4 is out of the range of the sensor (lower than 0.2 V (second given value) or higher than 4.8 V (third given value)) is maintained for 100 msec (second given period) in Step S116 that will be described later, because the "sensor failure flag" indicating that the sensor failure is decided is not set, the "sensor failure flag" is held as the initial value (clear). The above process in Step S112 is called "sensor failure determination invalidating process".

In Step S111, it is determined whether the sensor failure L flag has been set (=1=ON) or not, or the sensor failure H flag has been set (=1=ON) or not, that is, whether any of the above flags indicating that the input voltage from the input terminal 4 is out of the range of the sensor (lower than 0.2 V (second given value) or higher than 4.8 V (third given value), has been set or not. When any flag has been set, it is determined that the input sensor value (input voltage from the input terminal 4) is out of the range of the sensor, and the processing is advanced to Step S113. Also, when the condition of Step S111 is not met, it is determined that the input sensor value (input voltage from the input terminal 4) is within the range of the sensor, and the processing is advanced to Step S115.

In Step S113, it is determined whether the sensor failure determination counter is 0 msec or not, that is, whether a state in which the sensor failure L flag or the sensor failure H flag has been set is maintained continuously for 100 msec (second given period) or not. In the case where the sensor failure L flag or the sensor failure H flag has been set in Step S111, the processing does not pass through a route of Step S115 that will be described later. As a result, a countdown is conducted 5 msec by 5 msec in each of the main processing without resetting the sensor failure determination counter in Step S117. When the processing in this route is executed twenty times continuously in each of the main processing, the sensor failure determination counter becomes 0 msec. Hence, on the basis of the fact that the sensor failure determination counter is 0 msec, it is determined that a state in which the input sensor value (the input voltage from the input terminal 4) is out of the range of the sensor (lower than 0.2 V (second given value) or higher than 4.8 V (third given value)) is maintained continuously for 100 msec (second given period), and the sensor failure is decided. As processing in this situation, in Step S114, a sensor failure recovery delay determination counter is set to 100 msec (third given period), and the sensor failure flag is set in order to indicate that the sensor failure is decided. In this example, the sensor failure flag is used for the ground fault/disconnection detecting process that will be described later. Also, the reason that the sensor failure recovery delay determination counter is set to 100 msec (third given period) is because the initial value for sensor failure recovery determination is set in Step S114, and used in the sensor failure recovery determining process that will be described in Steps S115 and S116 later when the input voltage from the input terminal 4 is again returned within the sensor range. Also, in this embodiment, the third given period is set to the same value (100 msec) as the second given period in Step S114 of FIG. 2. With the above setting, a period required for sensor failure determination can be made equal to a period required for the sensor failure recovery determination.

When it is determined that the input sensor value (input voltage from the input terminal 4) is normal in Step S111, the sensor failure recovery determining process is conducted in Step S115. In the case where the sensor failure L flag or the sensor failure H flag has been cleared (=0) in Step S111, the processing does not pass through the above route of Step S114. As a result, a countdown is conducted 5 msec by 5 msec in each of the main processing without setting the initial value (100 msec) in the sensor failure recovery delay determination counter in Step S117. When the processing in this route is executed twenty times continuously in each of the main processing, the sensor failure recovery delay determination counter becomes 0 msec. Hence, on the basis of the fact that the sensor failure recovery delay determination counter is 0 msec, it is determined that a state in which the input sensor value (the input voltage from the input terminal 4) is within the range of the sensor is maintained continuously for 100 msec (third given period), and the sensor failure recovery is decided. As processing in this situation, in Step S116, the sensor failure determination counter is set to 100 msec (second given period) which is the initial value, and the sensor failure flag is also cleared (=0) in order to indicate that the sensor failure recovery determination is decided. In this way, when the recovery from the sensor failure is decided after the sensor failure is decided to set the sensor failure flag, a series of processing that clears the sensor failure flag is called "sensor failure recovery determining process".

In Step S117, the sensor failure determination invalidity counter, the sensor failure recovery delay determination counter, and the sensor failure determination counter immediately after the digital controller starts count down by 5 msec, respectively, and when the processing is completed, the processing is advanced to Step S118. However, when the respective counters are 0 msec, the countdown is not conducted by 0 clipping process, and the processing is advanced to Step S118.

In Step S118, it is determined whether the sensor failure determination invalidity counter immediately after the digital controller starts is not 0 or not, that is, whether the first given period is elapsing or not, or whether the sensor failure flag has been set (=1=ON) or not, that is, whether the sensor failure has been decided or not. When the sensor failure determination invalidity counter immediately after the digital controller starts is not 0, or the sensor failure flag has been set, it is determined that the sensor failure determination is invalid, or the sensor failure is decided, and then 5 V (first specified value) is output as the control sensor value (invalid value) (Step S124). When the condition of Step S118 is not met, it is determined that 10 msec (first given period) that is the sensor failure determination invalid period immediately after the digital controller starts is elapsing, or the sensor failure is being determined (sensor failure determination counter is not 0), and the processing is advanced to Step S119.

In Step S119, it is determined "whether the sensor failure L flag has been set or not", when 10 msec (first given period) that is the sensor failure determination invalid period immediately after the digital controller starts has elapsed, and the sensor failure is being determined (sensor failure determination counter is not 0). When the sensor failure L flag has been set (=1=ON), it is determined that the sensor failure has not yet been decided, and the input voltage from the input terminal 4 is lower than 0.2 V (second given value), and 0.2 V (third specified value) is output as the control sensor value (S123). When the condition of Step S119 is not met, the processing is advanced to Step S120 in order to determine whether the sensor failure H flag has been set (=1=ON) (the input voltage from the input terminal 4 is higher than 4.8 V (third given value)) or not.

In Step S120, it is determined "whether the sensor failure H flag has been set or not", when 10 msec (first given period) that is the sensor failure determination invalid period immediately after the digital controller starts has elapsed, the sensor failure is being determined (sensor failure determination counter is not 0), and the sensor failure L flag is not set. When the sensor failure H flag has been set, it is determined that the sensor failure has not yet been decided, and the input voltage from the input terminal 4 is higher than 4.8 V (third given value), and 4.8 V (second specified value) is output as the control sensor value (S122). When the condition of Step S120 is not met, because the input voltage from the input terminal 4 is within the range of the sensor (equal to or higher than 0.2 V (second given value) and equal to or lower than 4.8 V (third given value)), it is determined that the input sensor value (input voltage from the input terminal 4) is normal, and the input voltage value is output as the control sensor value (S121).

Through the above processing, in the case of the digital controller 1 of a type having no sensor 3, the output of the control sensor value when the switch 2 changes over from on to off is shown in FIG. 3. In the case the sensor 3 (input signal line 5) is disconnected when the switch 2 is off, the control sensor value of the invalid value is output during 100 msec (second given period) until the disconnection is detected, thereby making it possible to prevent the abnormal control sensor value from being output. Also, the sensor 3 or the input signal line 5 is disconnected at the time when the power supply is turned on, and the output of the control sensor value when the switch 2 is off is shown in FIG. 4. That is, the control sensor value of the invalid value is output after the disconnection detection determining process of 100 msec (second given period).

In this example, the same effects are obtained when an equal sign is included in the comparative determination of Step S101, when an equal sign is not included in the comparative determination of Steps S104 and S107, and when the first, second, and third given periods are replaced with the first, second, and third given times on the basis of the number of determinations in the process that is repeated in a given cycle.

Also, the first to third given values can be ground determination values that can determine a state where the input signal line 5 is grounded, respectively, or ground fault determination values and disconnection determination values which can determine that the input signal device outputs a signal lower (ground fault) or higher (disconnection) than the output range, which are not limited to the above values. Also, the first to third specified values and the values of the first to third given periods (the number of times) can be appropriately selected, and are not limited to the above values.

Second Embodiment

Figure 5:
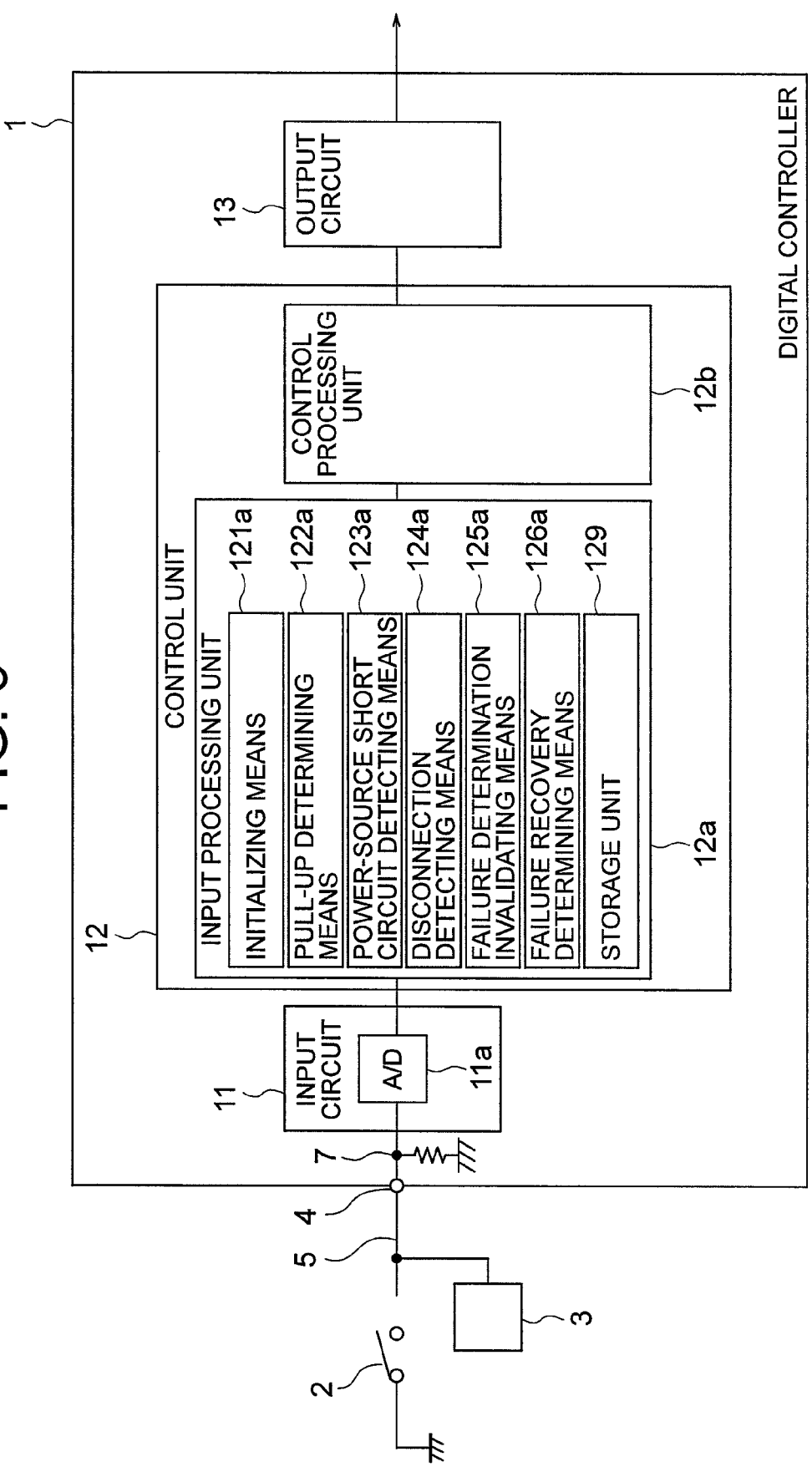
FIG. 5 is a diagram showing the configuration of a digital controller according to another embodiment of the present invention.

FIG. 5 is a diagram showing the configuration of a digital controller according to another embodiment of the present invention. In the digital controller 1, the switch 2 in FIG. 1 is replaced with a switch that is on in a pull-up state to the power supply, and off in other states. Also, the digital controller 1 shown in FIG. 1 is a controller of the low active operation (ground state is determined as the on-state of the switch 2). On the contrary, the digital controller 1 shown in FIG. 5 is a controller of the high active operation (pull-up state is determined as the on-state of the switch 2). A pull-down (ground) line 7 is connected between the input terminal 4 and the input circuit 11. Also, in this embodiment, the input processing unit 12a includes an initializing means 121a, a pull-up determining means 122a, a power-source short circuit detecting means 123a, a disconnection detecting means 124a, a failure determination invalidating means 125a, a failure recovery determining means 126a, and the storage unit 129.

Figure 6:
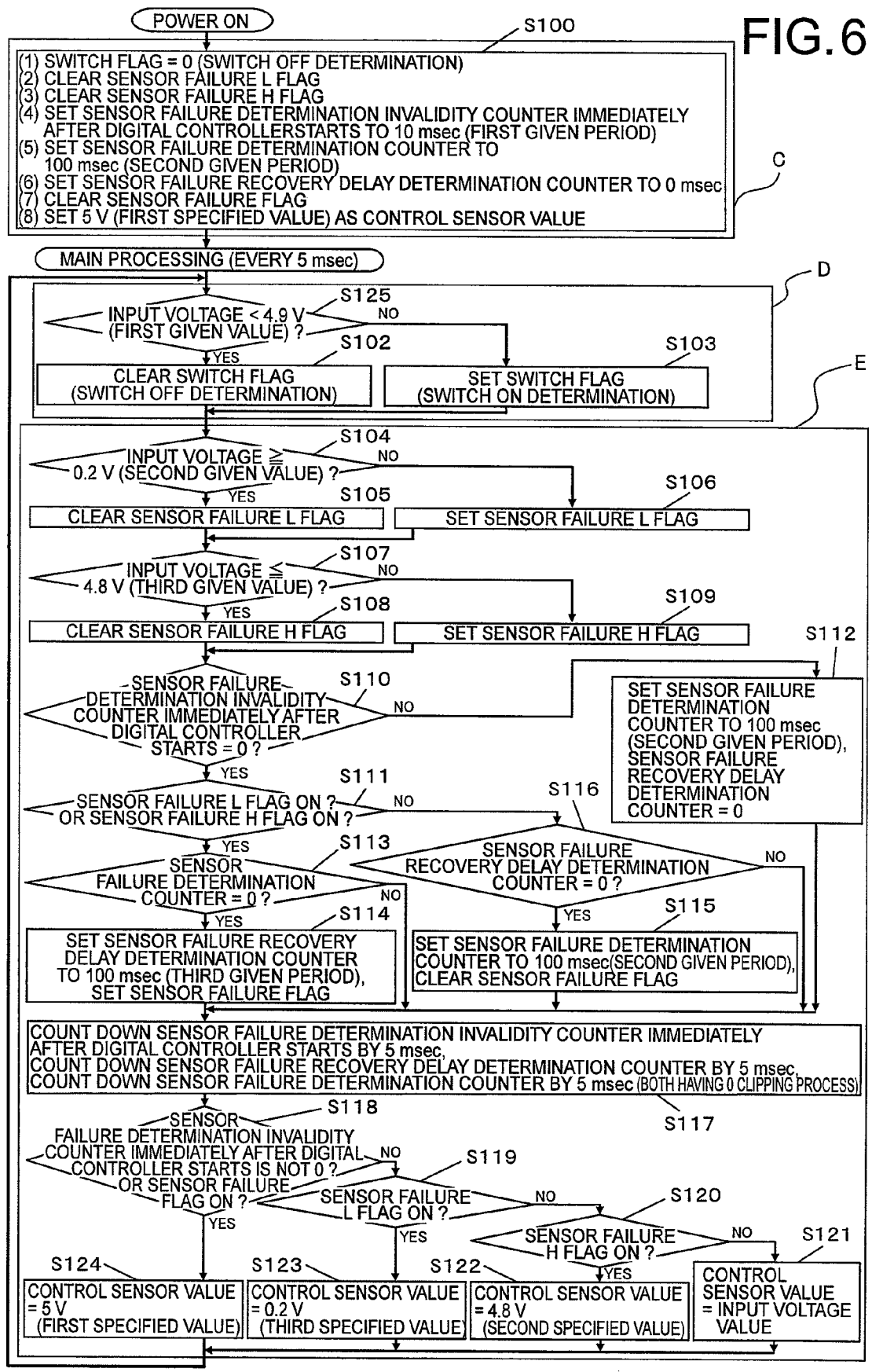
FIG. 6 is a flowchart showing the operation of a digital controller according to a second embodiment of the present invention.

A flowchart representative of the processing of the input processing unit 12a in FIG. 5 is shown in FIG. 6. In the respective drawings, the identical or corresponding parts with or to those in the above embodiment are indicated by like or associated signs, and their description will be omitted (the same is applied below). Referring to FIG. 6, a pull-up determining section D corresponding to the pull-up determining means 122a is called "pull-up determining process", a power-source short circuit/disconnection detecting section E corresponding to the power-source short circuit detecting means 123a, the disconnection detecting means 124a, the failure determination invalidating means 125a, and the failure recovery determining means 126a is called "power-source short circuit/disconnection detecting process", and an initializing section C corresponding to the initializing means 121a is called "initializing process".

In the flowchart of the first embodiment related to the controller of the low active operation shown in FIG. 2, the first given value is set to 0.1 V. In the case of the flowchart shown in FIG. 6 which is applied to the controller of the high active operation of FIG. 5 according to this embodiment, the first given value is set to 4.9 V. In the controller of FIG. 1, when the switch 2 is turned on, the input voltage decreases to about 0 V, the first given value that is an on-determination threshold value of the switch 2 is set to 0.1 V. In the case of the controller shown in FIG. 5, when the switch 2 is turned on, the input voltage from the input terminal 4 increases to, for example, about 5 V which is the supply voltage. Accordingly, it is necessary to set the on-determination threshold value of the switch 2 to about 5 V. Therefore, in Step S101 of the flowchart shown in FIG. 2, it is determined whether the input voltage is higher than 0.1 V (first given value) or not. However, in corresponding Step S125 of FIG. 6, the first given value is set to, for example, 4.9 V, and it is determined "whether the input voltage is lower than 4.9 V (first given value) or not". When the input voltage is lower than 4.9 V (first given value), it is determined that the switch 2 is not on, and the switch flag is cleared (=0) (Step S102). When the input voltage is equal to or higher than 4.9 V (first given value), it is determined that the switch 2 is turned on, and the switch flag is set (=1) (Step S103). Those processings are called "pull-up determining process" (the pull-up determining section D in FIG. 6).

Also, referring to FIG. 2, the process of determining "whether the input voltage is equal to or higher than 0.2 V (second given value) or not in Step S104 means that it is determined "whether it is in the ground fault state or not". The process of determining "whether the input voltage is equal to or lower than 4.8 V (third given value) or not" in Step S107 of FIG. 2 means that it is determined "whether it is the disconnection state or not". For that reason, those processings are called "ground fault/disconnection detecting process". However, when disconnection occurs somewhere in the input signal line 5 in FIG. 5, the voltage of the input signal line 5 decreases to about ground potential (0 V) by means of the pull-down line 7 between the input terminal 4 of the controller and the A/D converter 11*a*. Therefore, corresponding Step S104 of FIG. 6 means that it is determined "whether it is in the disconnection state or not", and Step S107 of FIG. 6 means that it is determined "whether it is in the power-source short circuit state or not". Therefore, those processings are called "power-source short circuit/disconnection detecting process" (power-source short circuit/disconnection detecting process in FIG. 6).

Accordingly, a purpose of determining the second given value and the third given value is different from that in the first embodiment, but the ground fault and disconnection detecting process of FIG. 2 is identical with the power-source short circuit and disconnection detecting process of FIG. 6. Then, in the second embodiment, the third given period is set to the same value (100 msec) as the second given period in Step S114 of FIG. 6, as in the first embodiment. With the above setting, a period required for sensor failure determination can be made equal to a period required for the sensor failure recovery determination.

Similarly, with the above configuration, the same advantages as those in the first embodiment are obtained.

Also, the first to third given values can be pull-up determination values that can determine a state where the input signal line 5 is in the pull-up state, respectively, or disconnection determination values and power-source short circuit determination values which can determine that the input signal device outputs a signal lower (disconnection) or higher (power-source short circuit) than the output range, which are not limited to the above values. Also, the first to third specified values and the values of the first to third given periods (the number of times) can be appropriately selected, and are not limited to the above values.

Third Embodiment

Figure 7:
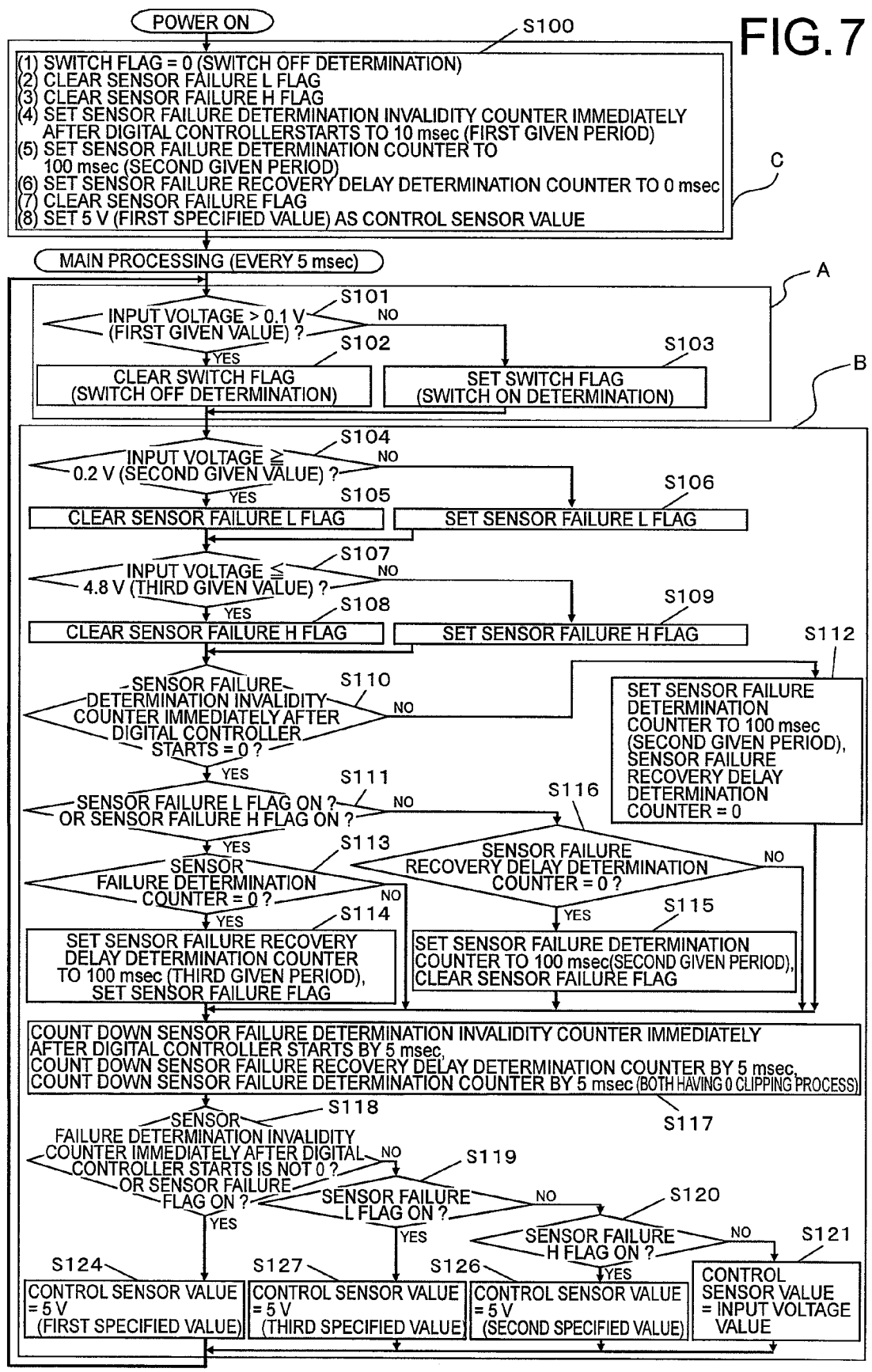
FIG. 7 is a flowchart showing the operation of a digital controller according to a third embodiment of the present invention.

FIG. 7 is a flowchart showing another operation of the input processing unit 12*a* in the digital controller 1 shown in FIG. 1 according to a third embodiment. A difference from the flowchart of FIG. 2 resides in that the control sensor value is set to 4.8 V (second specified value) in Step S122 of FIG. 2 whereas the second specified value is set to 5 V (invalid value) in corresponding Step S126 in the flowchart of FIG. 7. Also, the control sensor value is set to 0.2 V (third specified value) in Step S123 of FIG. 2 whereas the third specified value is set to 5 V (invalid value) in corresponding Step S127 in the flowchart of FIG. 7. That is, the first, second, and third specified values are identical with each other.

Similarly, in the digital controller 1 of FIG. 5, the first, second, and third specified values in Steps S122, S123, and S124 of the flowchart shown in FIG. 6 can be identical with each other.

Even with the above configuration, the same advantages are obtained.

Fourth Embodiment

Figure 8:
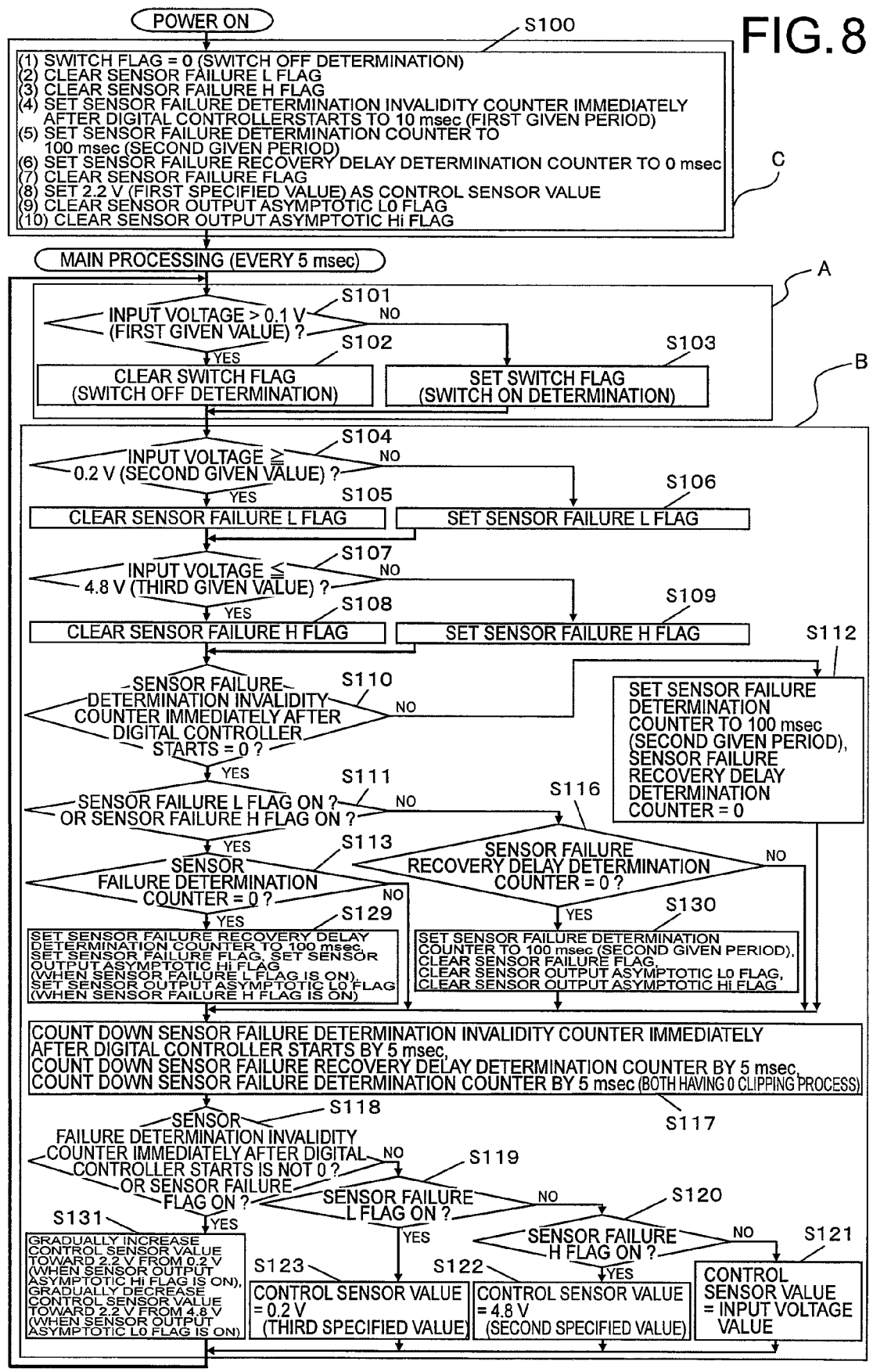
FIG. 8 is a flowchart showing the operation of a digital controller according to a fourth embodiment of the present invention.

FIG. 8 is a flowchart showing still another operation of the input processing unit 12*a* in the digital controller 1 shown in FIG. 1 according to a fourth embodiment. A difference from FIG. 2 resides in the following features.

First, in the item (8) of Step S100 of the initializing process in FIG. 2, the first specified value is set to 5 V as the initial value of the control sensor value. However, in the item (8) of Step S128 of the corresponding initializing process in the flowchart of FIG. 8, the first specified value is set to, for example, 2.2 V as the initial value of the control sensor value. Also, a "sensor output asymptotic $L_O$ flag" and a "sensor output asymptotic $H_i$ flag" are newly provided. The sensor output asymptotic $L_O$ flag" indicates that the control sensor value gradually decreases, and the "sensor output asymptotic $H_i$ flag" indicates that the control sensor value gradually increases. The initial values of the sensor output asymptotic $L_O$ flag and the sensor output asymptotic $H_i$ flag are set to be in the clear state in the items (9) and (10) of Step S128 of the initializing process in FIG. 8 (Step S128). Those flags are set when it is determined that the sensor failure is decided (Step S129), and cleared when it is determined that the sensor failure recovery is decided (Step S130). Then, those flags are used as the conditions for executing the asymptotic process of the control sensor value (Step S131).

In FIG. 2, when it is determined that the sensor failure is decided in Step S113, the sensor failure recovery delay determination counter is set to 100 msec (third given period) in Step S114, and the sensor failure flag is set. On the contrary, in the corresponding Step S128 in the flowchart of FIG. 8, there is further conducted a process of "setting the sensor output asymptotic $H_i$ flag when the sensor failure L flag is on, and setting the sensor output asymptotic $L_O$ flag when the sensor failure H flag is on" in order to indicate that the asymptotic process of the control sensor value is conducted.

Also, when it is determined that the sensor failure recovery is decided in Step S115 of FIG. 2, the sensor failure determination counter is set to 100 msec (second given period), and the sensor failure flag is cleared in Step S116. On the contrary, in the corresponding Step S130 of the flowchart of FIG. 8, there is further conducted a process of "clearing the sensor output asymptotic $L_O$ flag, and clearing the sensor output asymptotic $H_i$ flag" in order to indicate that the asymptotic process of the control sensor value is canceled.

Further, in the flowchart of FIG. 2, the first specified value is set to 5 V in Step S124, and 5 V (first specified value) is output as the control sensor value. On the contrary, in the corresponding Step S131 of the flowchart of FIG. 8, the first specified value is set to, for example, 2.2 V, and there is conducted a process of "asymptotically increasing the control sensor value toward 2.2 V (first specified value) from 0.2 V (third specified value) when the sensor output asymptotic $H_i$ flag is on, and asymptotically decreasing the control sensor value toward 2.2 V (first specified value) from 4.8 V (second specified value) when the sensor output asymptotic $L_O$ flag is on".

Similarly, the following processing can be conducted in the flowchart of FIG. 6 showing the operation of the digital controller 1 shown in FIG. 5. That is, there is conducted an initializing process of "clearing the sensor output asymptotic $L_0$ flag, and clearing the sensor output asymptotic $H_i$ flag", in addition to the processing of Step S100. There is conducted a process of "setting the sensor output asymptotic $H_i$ flag when the sensor failure L flag is on, and setting the sensor output asymptotic $L_0$ flag when the sensor failure H flag is on", in addition to the processing of Step S114. There is conducted a process of "clearing the sensor output asymptotic $L_0$ flag, and clearing the sensor output asymptotic $H_i$ flag", in addition to the processing of Step S116. In Step S124, the first specified value is set to, for example, 2.2 V, and there is conducted a process of "asymptotically increasing the control sensor value toward 2.2 V (first specified value) from 0.2 V (third specified value) when the sensor output asymptotic $H_i$ flag is on, and asymptotically decreasing the control sensor value toward 2.2 V (first specified value) from 4.8 V (second specified value) when the sensor output asymptotic $L_0$ flag is on".

Even with the above configuration, the same advantages are obtained.

Also, in the respective embodiments, the respective given periods, regular numbers of times, given values, and specified values are only described as examples, and can be appropriately set according to the implementation conditions.

What is claimed is:

1. A digital controller that converts an analog input signal from a signal output device that is connected to an input signal line into a digital input signal to output a control signal obtained by conducting a given calculating process on the digital input signal, the digital controller comprising:

an analog/digital converter that is connected to an input terminal connected with the input signal line, and converts the analog input signal into the digital input signal;

an input processing unit that obtains a control input value taking into consideration ground, ground fault, and disconnection of the input signal line according to an output of the analog/digital converter; and a signal output device power supply that is connected to the input terminal within the digital controller, wherein the input processing unit comprises:

ground determining means for determining that the input signal line is grounded when a voltage from the input terminal that is connected with the input signal line is equal to or lower than a ground determination value;

failure determination invalidating means for outputting a first specified value as the control input value regardless of the voltage from the input terminal during a first given period immediately after the digital controller starts;

ground fault detecting means for conducting a ground fault determining process on the input signal line when the voltage from the input terminal is lower than a ground fault determination value which is a lower limit of an output range of the signal output device after the first given period, outputting a value based on the voltage from the input terminal as the control input value when the voltage from the input terminal is equal to or higher than the ground fault determination value and equal to or lower than a disconnection determination value that is an upper limit of the output range, outputting a third specified value as the control input value during a second given period after the first given period when the voltage from the input terminal is lower than the ground fault determination value, and outputting the first specified value as the control input value when a state in which the voltage from the input terminal is lower than the ground fault determination value is maintained for the second given period or longer; and disconnection detecting means for conducting a disconnection determining process on the input signal line when the voltage from the input terminal is higher than the disconnection determination value after the first given period, outputting a second specified value as the control input value during the second given period, and outputting the first specified value as the control input value when a state in which the voltage from the input terminal is higher than the disconnection determination value is maintained for the second given period or longer.

2. A digital controller that converts an analog input signal from a signal output device that is connected to an input signal line into a digital input signal to output a control signal obtained by conducting a given calculating process on the digital input signal, the digital controller comprising:

an analog/digital converter that is connected to an input terminal connected with the input signal line, and converts the analog input signal into the digital input signal;

an input processing unit that obtains a control input value taking into consideration a pull-up state, power-source short circuit, and disconnection of the input signal line according to an output of the analog/digital converter; and a pull-down line that is connected to the input terminal within the digital controller, wherein the input processing unit comprises:

pull-up determining means for determining that the input signal line is in the pull-up state when a voltage from the input terminal that is connected with the input signal line is equal to or higher than a pull-up state value;

failure determination invalidating means for outputting a first specified value as the control input value regardless of the voltage from the input terminal during a first given period immediately after the digital controller starts;

disconnection detecting means for conducting a disconnection determining process on the input signal line when the voltage from the input terminal is lower than a disconnection determination value which is a lower limit of an output range of the signal output device, outputting a value based on the voltage from the input terminal as the control input value when the voltage from the input terminal is equal to or higher than the disconnection determination value after the first given period, outputting a third specified value as the control input value during a second given period after the first given period when the voltage from the input terminal is lower than the disconnection determination value, and outputting the first specified value as the control input value when a state in which the voltage from the input terminal is lower than the disconnection determination value is maintained for the second given period or longer; and power-source short circuit detecting means for conducting a power-source short circuit determining process on the input signal line when the voltage from the input terminal is higher than a power-source short circuit determination value that is an upper limit of the output range of the signal output device after the first given period, outputting a second specified value as the control input value during the second given period, and outputting the first specified value as the control input value when a state in which the voltage from the input terminal is higher than the power-source short circuit determination value is maintained for the second given period or longer.

3. A digital controller according to claim 1, wherein the first specified value is a value indicative of invalidity.

4. A digital controller according to claim 2, wherein the first specified value is a value indicative of invalidity.

5. A digital controller according to claim 1, wherein the first specified value, the second specified value, and the third specified value are equal to each other.

6. A digital controller according to claim 2, wherein the first specified value, the second specified value, and the third specified value are equal to each other.

7. A digital controller according to claim 1, further comprising:
   means for outputting a value that gradually approaches the first specified value from the third specified value as the control input value when the ground fault detecting means determines a ground fault when the state in which the voltage from the input terminal is lower than the ground fault determination value is maintained for the second given period or longer; and
   means for outputting a value that gradually approaches the first specified value from the second specified value as the control input value when the disconnection detecting means determines a disconnection when the state in which the voltage from the input terminal is higher than the disconnection determination value is maintained for the second given period or longer.

8. A digital controller according to claim 2, further comprising:
   means for outputting a value that gradually approaches the first specified value from the third specified value as the control input value when the disconnection detecting means determines a disconnection when the state in which the voltage from the input terminal is lower than the disconnection determination value is maintained for the second given period or longer; and
   means for outputting a value that gradually approaches the first specified value from the second specified value as the control input value when the power-source short circuit detecting means determines a power-source short circuit when the state in which the voltage from the input terminal is higher than the power-source short circuit determination value is maintained for the second given period or longer.

9. A digital controller according to claim 1, further comprising means for determining a failure when a state in which the voltage from the input terminal is higher than the disconnection determination value is maintained for the second given period or longer, and determining failure recovery when a state in which the voltage from the input terminal is equal to or lower than the disconnection determination value is maintained for a third given period or longer.

10. A digital controller according to claim 2, further comprising means for determining failure when a state in which the voltage from the input terminal is lower than the disconnection determination value is maintained for the second given period or longer, and determining failure recovery when a state in which the voltage from the input terminal is equal to or higher than the disconnection determination value is maintained for a third given period or longer.

11. A digital controller according to claim 9, wherein the second given period and the third given period are equal to each other.

12. A digital controller according to claim 10, wherein the second given period and the third given period are equal to each other.

* * * * *